United States Patent [19]

Peters

[11] 4,268,084
[45] May 19, 1981

[54] TRUCK HAVING A LOAD PLATFORM AND SUPERSTRUCTURE

[76] Inventor: Günter Peters, Staumühle 228, 4791 Hövelhof, Fed. Rep. of Germany

[21] Appl. No.: 17,261

[22] Filed: Mar. 5, 1979

[30] Foreign Application Priority Data

Mar. 4, 1978 [DE] Fed. Rep. of Germany ....... 2809375

[51] Int. Cl.³ .............................................. B60P 7/04
[52] U.S. Cl. .................................... 296/148; 296/100
[58] Field of Search ................... 296/148, 137 B, 100, 296/146, 147, 219; 49/119, 211, 99, 120

[56] References Cited

U.S. PATENT DOCUMENTS 1,864,667  6/1932  Peelle ................................ 49/120 X
4,140,339  2/1979  Fredin ............................ 296/137 B

FOREIGN PATENT DOCUMENTS 2400242  7/1975  Fed. Rep. of Germany ...... 296/148

Primary Examiner—John J. Love
Assistant Examiner—Norman L. Stack, Jr.
Attorney, Agent, or Firm—Charles E. Baxley

[57] ABSTRACT

Apparatus for assisting in opening and closing the side of a truck-body is shown and described. Illustratively, a pully is mounted eccentrically on one end of the shaft to which the swingable portion of the truck roof is fixed. A system of traction cables and a tension spring combine with gravity forces acting on the pivotal lower lateral wall portion of the truck to reduce the effort needed to open and close the side of the truck.

10 Claims, 6 Drawing Figures

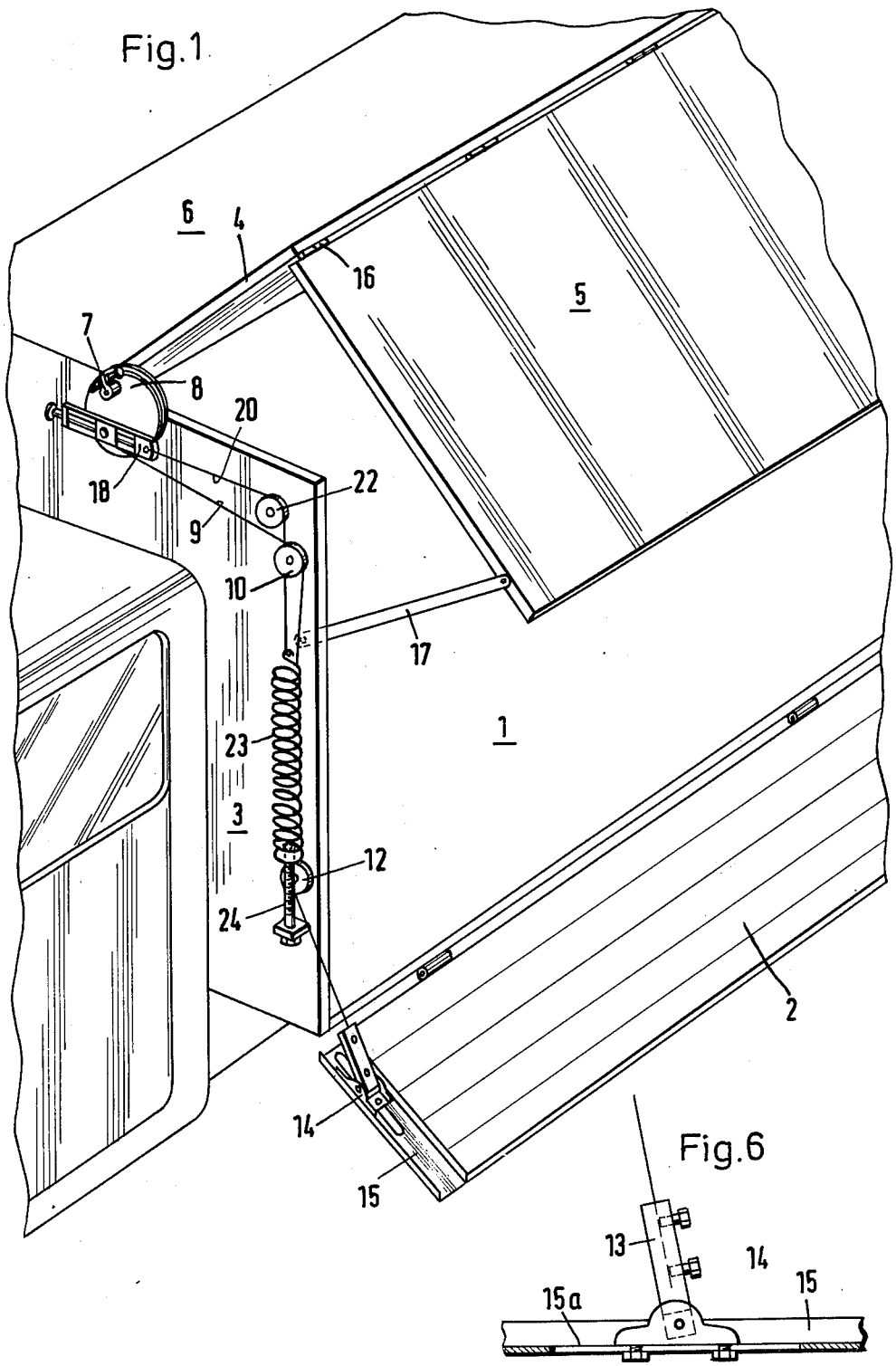

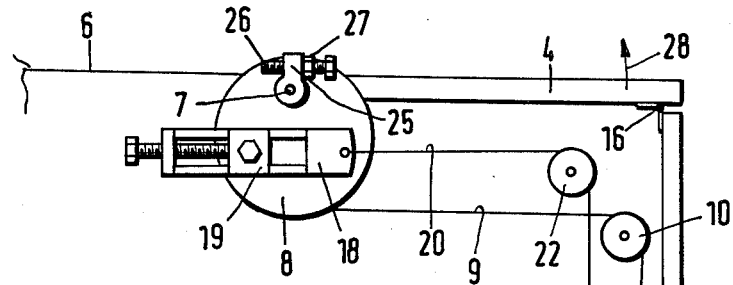
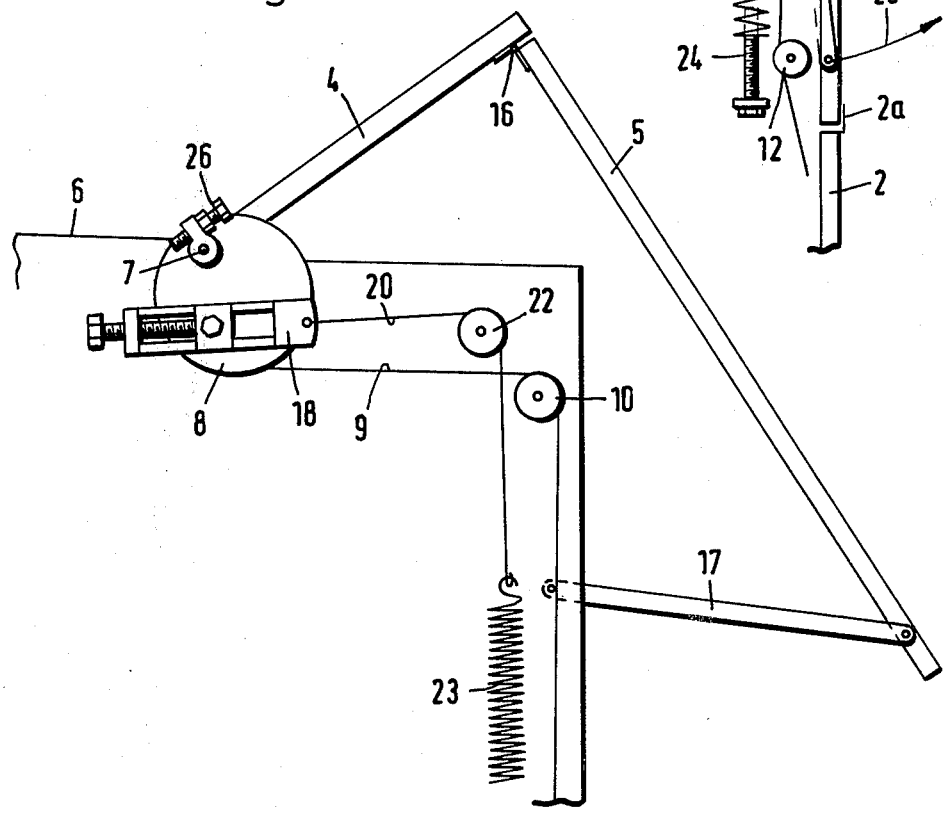

TRUCK HAVING A LOAD PLATFORM AND SUPERSTRUCTURE

TECHNICAL FIELD

This invention relates to vehicles and, more particularly, to apparatus for opening and closing the sides on truck-bodies, and the like. The invention relates to trucks of the kind having a load platform and superstructure, comprising high front and rear walls, low lateral wall portions which can be swung outwards and downwards and upper lateral wall portions which can be raised and pivoted, together with an adjoining roof portion, about a pivotal axis that is parallel to the longitudinal axis of the vehicle. There also is provided a lever and traction cable connection between, on the one hand the roof portions with the upper lateral wall portions, and, on the other hand the lower lateral wall portions.

BACKGROUND ART

Trucks of this kind are especially convenient for use in the bottling industry in which boxes are transported containing beverage bottles. When the lateral walls are opened outwards, the boxes containing empty beverage bottles, which are preferably stacked on pallets, are off-loaded and other boxes containing full bottles, also stacked preferably on pallets, are on-loaded.

The arrangement of lateral wall portions which can be swung upwards or downwards, has the advantage that, by virtue of the operating means connecting the lateral wall portions, the entire side of the vehicle can be completely exposed through a manual control. By means of the compensatory operating connection between the upward and downward povoting members of the lateral walls, the weight-load of these members is reduced whereby the opening and closing operations require little effort.

An arrangement in which the upper lateral wall portions and the roof portions project upwards in the open position may offer difficulties in the case of loading ramps with restricted overhead accommodation. This problem, however, is overcome through the present invention which provides an arrangement in which an upper lateral wall portion and its associated roof portion are folded flat together during the upwards swing in order to come to rest in a flat folded condition upon the vehicle roof.

SUMMARY OF THE INVENTION

The problem posed is solved, in accordance with the present invention, by hinging together each roof portion and its associated upper lateral wall portion, in a truck of the kind under consideration. A pulley, moreover, is mounted eccentrically on the shaft about the axis of the roof portion hinge and a cable is led to the lower lateral wall portion. Further in this respect, the upper lateral wall portion is connected to the front and rear walls of the lorry by hinged ties. A turnbuckle mounted eccentrically on the pulley wheel is preferably connected by way of a traction cable to a tension spring. The position of the turnbuckle on the pulley wheel is so chosen that, when the lateral wall portions are in the closed position, the tension spring is considerably extended. With the lateral wall portions opened to the extent that the hinges of the ties reach their uppermost position during the combined swinging movement of the roof portion and the upper lateral wall portion, however, the tension on the spring is relaxed to a minimum as the swinging movement of the roof portion together with the upper lateral wall portion continues to the fully-open position, the tension increases to a maximum.

According to a special feature of the invention, that diameter of the pulley, defined by the eccentric mounting of the pulley on the shaft about the axis of which the roof portion is hinged, forms a right angle with the upper surface of the roof portion. The position of the turnbuckle on the pulley also is eccentric and is mounted on the side of the pulley that is furthest from the lateral wall in such a way that it is offset by approximately 90° relative to the point of attachment of the pulley on the pivot shaft. In accordance with a further feature of the invention, there is mounted on the pivot shaft of the pulley a short arm which projects radially outwards. This arm carries a tension screw that is disposed tangent to the pulley. In these circumstances, as the lateral wall portions open and the ties reach their uppermost positions during the swinging movement of the roof portion and upper lateral wall portion, the tension screw contacts the turnbuckle. Preferably, the turnbuckle forms a lever on one end of which the cable to the tension spring is fastened. Thus, as the lateral wall portions open, the turnbuckle remains in alignment with the cable until the roof portion together with the upper lateral wall portion have been swung open to the extent that the tie hinges reach their uppermost positions. At this point the tension screw contacts the turnbuckle and turns it along with the pulley.

According to a further feature of the invention, the width of the raisable roof portion is not more than one quarter of the total width of the roof.

It also is preferred for that cable which is passed around the pulley and connected to the lower lateral wall portion to pass over a guide pulley that is mounted on the front wall of the vehicle and close to its upper edge. For ease of adjustment, the cable passing over the main pulley is secured to the lower lateral wall portion by a swivel bracket which is adjustable in height. For this purpose, the crosspiece on the lateral wall portion is provided with slots. It has also been found advisable to provide a second guide pulley over which the cable from the main pulley passes before it reaches the swivel bracket on the lower wall portion, the second guide pulley being positioned on the front wall approximately on a level with the upper edge of the lower wall portion.

It is clear that the new lever and traction cable connection between the roof portion together with the upper lateral wall portion, and the lower lateral wall portion produces a very favourable balancing of the forces in the opening and closing operations in order to reduce the effort involved to a minimum.

BRIEF DESCRIPTION OF THE DRAWINGS

An embodiment of the invention will now be described, by way of example and in more detail, with reference to the accompanying drawings, in which:

FIG. 1 is a perspective view of the lateral wall portions in the approximately half-open position;

FIG. 2 is a diagrammatic view of the arrangement in the closed position;

FIG. 3 is a diagrammatic view of the arrangement in the approximately one-third-open position;

FIG. 6 shows a detail of the cable-securing means on the lower lateral wall portion.

DETAILED DESCRIPTION

Figure 4:
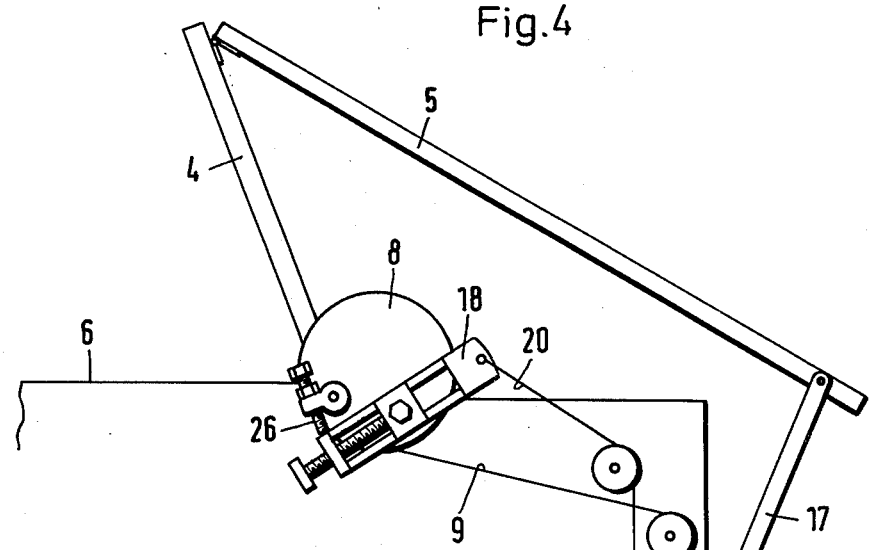
FIG. 4 is a diagrammatic view of the arrangement in the approximately two-thirds-open position.

The load platform 1 (FIG. 1) of a truck is provided with a lower lateral wall portion 2 which may be opened outwards and downwards, a fixed front wall 3, a fixed rear wall (not illustrated), a roof portion 4, that can be raised upwards and outwards, and an upper lateral wall portion 5 with hinge-connection to said roof portion 4. A lever and traction cable arrangement is provided, by means of which the lower lateral wall portion 2 is automatically opened outwards and downwards, while at the same time the roof portion 4 and upper lateral wall portion 5 are raised to open and are folded together to come to rest upon a fixed central roof portion 6. The raisable roof portion 4 fits snugly against the fixed central roof portion 6 and is secured to for pivotal movement with a pivotal shaft 7 that is disposed parallel to the longitudinal axis of the vehicle. The shaft 7, moreover, is securely journaled to the vehicle. The pivotal shaft 7 is mounted on the upper edge of the fixed front wall 3 and the fixed rear wall (not shown), and is provided on the outside of the front wall 3 with an eccentrically and rigidly mounted pulley 8.

As shown in FIG. 2, the diameter of the pulley 8 that passes through the pivotal shaft 7, forms a right angle with the plane of the upper surface of the roof portion 4.

A traction cable 9 passing around the main pulley 8 and secured thereto, passes over a first guide pulley 10 mounted close to the lateral edge of the front wall 3, then over a second guide pulley 12 (FIG. 1) mounted on the front wall 3 approximately on a level with the upper edge of the lower lateral wall portion 2. The bitter end of the cable 9 is provided with an end-piece 13 (FIG. 6) attached by locking screws and pivotally mounted on a swivel bracket 14 which is secured approximately at the centre of the cross-member 15, so that it is vertically adjustable in slots 15a.

As shown in FIG. 2, at the longitudinal edge of the raisable roof portion 4 located opposite the shaft 7 is pivotally connected by a hinge 16 to the upper lateral wall portion 5. In order to support and guide the upper lateral wall portion 5, a pair of struts, of which only the strut 17 is shown, are provided close to the two opposite, outer verticle longitudinal edges of the wall portion 5. Each of these struts are secured, respectively, to the fixed front wall 3 and fixed rear wall. When the lateral wall portions 5 and 2 are in the closed position, not only is the upper lateral wall portion 5 secured against swivelling outwards, but also the strut 17 and its companion strut are prevented from upward movement by a metal strip 2a. The strip 2a is fastened along the upper edge of the lower lateral wall portion 2 and protrudes above the upper edge of the lower lateral wall portion in order to bear against the lower edge of the upper lateral wall portion 5.

On the pulley 8 there is also provided a turnbuckle 18. As shown, the turnbuckle 18 has a sliding piece 19 which is mounted eccentrically relative to the pivotal shaft 7 and is offset towards the vehicle-centre. As shown in FIG. 2, the horizontal axis of the sliding piece 19 is perpendicular to the eccentric diameter of the pulley 8.

A second traction cable 20 is passed from the free extremity of the turnbuckle 18 by way of a third guide pulley 22 to a traction spring 23, the tension of which may be adjusted by a threaded rod 24 (FIG. 1) that is affixed to the fixed front wall 3.

To the pivotal shaft 7 of the pulley 8 a short arm 25 is attached. The arm 25 is directed radially outwards and carries a tension screw 26 that is securable in an adjusted position by means of a locking screw 27.

In the closed position (FIG. 2) the upper lateral wall portion is secured, as described above, by the lower lateral wall portion 2 and the struts 17. The tension spring 23 is sufficiently stressed to urge the pulley wheel 8 by way of the turnbuckle 18 in the counter-clockwise direction. With such an arrangement, as the lower lateral wall portion is opened and swung downwards, the tension on the cable 9 is increased. This increase in spring tension rotates the pulley 8 around the axis of the pivotal shaft 7, consequently swinging the roof portion 4 in the direction of the arrow 28 and also moving the upper lateral wall portion 5 in the direction of the arrow 29. These movements take place without requiring a great deal of effort to swing down the lower lateral wall portion 2.

In FIG. 3 the position of opening is shown when about one-third completed. The tension spring 23 is now somewhat relaxed. No further effort is required to continue the opening operation since it is assisted by the tension that is applied by way of the cable 9 from the lower lateral wall portion 2, which has now been swung outwards and downwards through a considerable distance. When the raisable roof portion 4 reaches the approximately vertical position, the tension screw 26 comes into contact with the turnbuckle 18, at which stage the tension spring 23 has reached approximately minimum tension. As the pivoting action continues, the turnbuckle 18 is now caused to rotate together with the pulley wheel whereby increasing stressing force is progressively applied to the tension spring 23.

Figure 5:
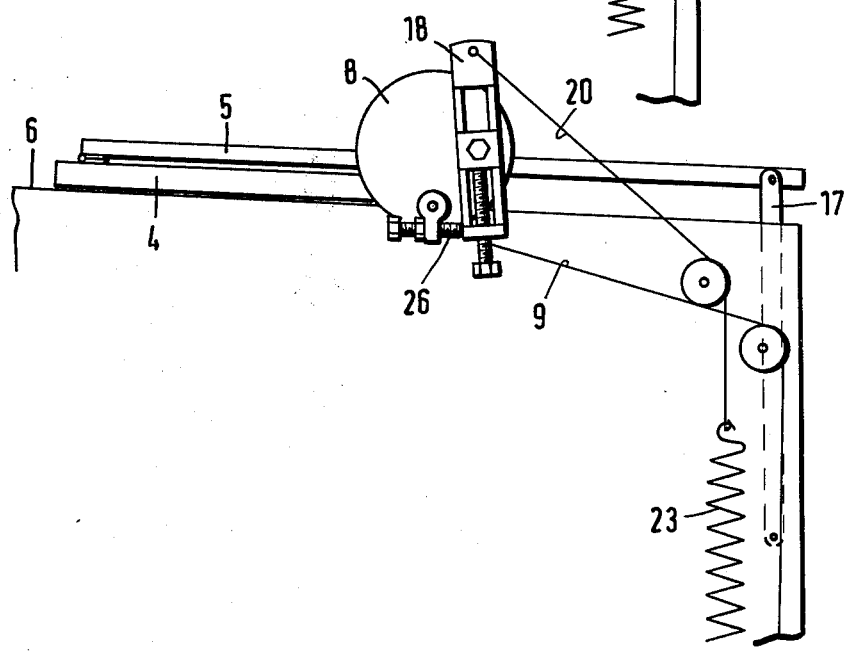
FIG. 5 is a diagrammatic view of the arrangement in the open position.

FIG. 4 illustrates the position in which the roof portion 4 has swung beyond the vertical, thus initiating a further application of tension to the tension spring 23. This increase in tension takes up the increasing moment produced by the weight of the over-swinging roof portion 4 together with the weight of the upper lateral wall portion 5 in the last one third of the opening operation. By means of this increasing tension of the tension spring 23, movement of the roof portion 4 and upper lateral wall portion 5 into the fully-open position shown in FIG. 5, is completely smooth, the tension spring 23 being now under maximum tension. In this position, the lower lateral wall portion has now also reached the fully-open position, that is to say, the vertically downward direction.

In order to close the lateral wall portions, it is only necessary to raise the lower lateral wall portion outward through a small distance. As the tension on the traction cable 9 is now relaxed, the tension spring 23 is now once again fully effective. The lever formed by the turnbuckle 18 bears against the tension screw 26 and enables the spring 23 to urge the pulley wheel 8 in the clockwise direction. These forces compel the roof portion 4 with the upper lateral wall portion 5 to raise and pivot through the vertical, whereupon the roof portion 4 with the upper lateral wall portion are permitted by their own weight to return to the closed position shown in FIG. 1. During the last part of this movement, the tension spring 23 is again stressed, thus once again compensating or balancing most conveniently the force of gravity. The manual operation of closing the walls thus is facilitated.

What I claim is:

1. A vehicle having a fixed central roof portion, a swingable roof portion that is hinged to the central roof portion by means of a shaft and an associated upper lateral wall portion hinged to the swingable roof portion comprising a pulley that is eccentrically mounted on the shaft about the axis of which the roof portion is swingable, a swingable lower lateral wall portion hinged to the vehicle, a traction cable connecting the lower lateral wall portion with said pulley in order to turn the pulley and the shaft and move the swingable roof portion therewith, a turnbuckle mounted eccentrically on the pulley, a tension spring attached to the vehicle, a traction cable coupling the turnbuckle to the tension spring, the turnbuckle on the pulley wheel being positioned to stress the tension spring with the lateral wall portions in the closed position, to relax the tension spring during the travel of the lateral wall portions toward the opened position, and to stress the tension spring to a maximum as the swinging movement terminates at the fully-open position.

2. A vehicle according to claim 1, in which that diameter of the pulley defined by the eccentric mounting of the pulley on the shaft forms a right angle with the upper surface of the swingable roof portion, the eccentric position of turnbuckle on the pulley being mounted on the side of the pulley further from the lateral wall the turnbuckle also being offset by approximately 90° relative to the point of attachment of the pulley to the pivot shaft.

3. A vehicle according to claim 2, further comprising, a short arm mounted on the pivotal shaft of the pulley, the short arm projecting radially outwards, a tension screw carried on the short arm and disposed tangent to the pulley to enable the tension screw to contact the turnbuckle as the lateral wall portions open during the swinging movement of the roof portion and upper lateral wall portion in order to stress the tension spring and complete the swinging open of the roof and side portions of the vehicle.

4. A vehicle according to claim 1 wherein the turnbuckle further comprises a lever on one end thereof for fastening the traction cable from the tension spring thereto, whereby, as the lateral wall portions open, the turnbuckle remains in alignment with the cable until the tension screw contacts the turnbuckle and turns it with the pulley.

5. A vehicle according to claim 1, in which the width of the swingable roof portion is not more than one-quarter of the total width of the roof.

6. A vehicle according to claim 1, in which, in the fully-open position, the roof portion together with the upper lateral wall portion are folded flat together and come to rest on the fixed portion of the vehicle roof.

7. A vehicle according to claim 1, in which the traction cable connecting the pulley to the lower lateral wall portion passes over a guide pulley mounted on the vehicle close to the swingable roof portion and the upper lateral wall portion.

8. A vehicle according to claim 7, in which the traction cable that connects the pulley wheel with the lower lateral wall portion is secured to that wall portion by a swivel bracket that is adjustable in height.

9. A vehicle according to claim 8, in which the lower lateral wall portion has longitudinal slots to enable the swivel bracket to be adjustable in height.

10. A vehicle according to claim 8 further comprising another guide pulley over which the traction cable that connects the pulley with the swivel bracket passes the other guide pulley being positioned on the vehicle approximately on a level with the upper edge of the lower wall portion.

* * * * *